United States Patent
Yaghmai

(10) Patent No.: US 9,407,848 B2
(45) Date of Patent: Aug. 2, 2016

(54) METHOD AND APPARATUS FOR PIXEL CONTROL SIGNAL VERIFICATION

(71) Applicant: Semiconductor Components Industries, LLC, Phoenix, AZ (US)

(72) Inventor: Sohrab Yaghmai, Oslo (NO)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 43 days.

(21) Appl. No.: 13/891,480

(22) Filed: May 10, 2013

(65) Prior Publication Data

US 2013/0308029 A1    Nov. 21, 2013

Related U.S. Application Data

(60) Provisional application No. 61/648,024, filed on May 16, 2012.

(51) Int. Cl.
| | |
|---|---|
| *H04N 5/335* | (2011.01) |
| *H04N 5/376* | (2011.01) |
| *H04N 5/3745* | (2011.01) |
| *H04N 17/00* | (2006.01) |

(52) U.S. Cl.
CPC ............. *H04N 5/376* (2013.01); *H04N 5/3745* (2013.01); *H04N 17/002* (2013.01)

(58) Field of Classification Search
USPC ....................................... 348/302; 250/208.1
See application file for complete search history.

(56) References Cited

U.S. PATENT DOCUMENTS

| | | | |
|---|---|---|---|
| 6,734,897 B1 | 5/2004 | Mentzer | |
| 2007/0272828 A1* | 11/2007 | Xu | ............................. 250/208.1 |
| 2008/0303905 A1* | 12/2008 | Chinnaveerappan | ......... 348/187 |
| 2009/0040349 A1* | 2/2009 | Xu | ........................ H04N 3/1562 348/302 |
| 2010/0328488 A1* | 12/2010 | Bamidele et al. | .......... 348/229.1 |
| 2013/0027565 A1 | 1/2013 | Solhusvik et al. | |
| 2013/0075584 A1 | 3/2013 | Yaghmai et al. | |
| 2013/0083204 A1 | 4/2013 | Solhusvik et al. | |

OTHER PUBLICATIONS

Solhusvik, U.S. Appl. No. 13/371,295, filed Feb. 10, 2012.

* cited by examiner

*Primary Examiner* — Roberto Velez
*Assistant Examiner* — Stephen Coleman
(74) *Attorney, Agent, or Firm* — Treyz Law Group, P.C.; Michael H. Lyons; Vineet Dixit

(57) ABSTRACT

Imaging systems may be provided with image sensors having an array of image pixels coupled to row control circuitry and verification circuitry. The row control circuitry may provide row control signals to the image pixels for capturing image data. The verification circuitry may receive the row control signals through the array of image pixels. The verification circuitry may identify predetermined ranges of acceptable row control signal magnitudes based on the type of row control signal and the mode of operation of the image sensor. The verification circuitry may be configured to compare row control signal magnitudes to the predetermined acceptable ranges. If the row control signal magnitudes are outside of one or more of the predetermined ranges, circuitry in the imaging system may be shut off and/or a fault signal such as an audible or visible failure alert signal may be produced for an operator of imaging system.

20 Claims, 8 Drawing Sheets

METHOD AND APPARATUS FOR PIXEL CONTROL SIGNAL VERIFICATION

This application claims the benefit of provisional patent application No. 61/648,024, filed May 16, 2012, which is hereby incorporated by reference herein in its entirety.

BACKGROUND

This relates generally to imaging devices, and more particularly, to imaging devices with verification circuitry.

Image sensors are commonly used in electronic devices such as cellular telephones, cameras, and computers to capture images. In some situations, it may be desirable to occasionally verify that the components of an image sensor are operating properly before, during, and/or after operation of an electronic device.

It can be difficult to generate repeatable verification signals that test the components of an imaging system. Providing a system or device with a separate and dedicated verification system can add additional cost and complexity to the manufacturing and assembly of the system or device.

It would therefore be desirable to be able to provide improved imaging systems with system verification capabilities.

DETAILED DESCRIPTION

Figure 1:
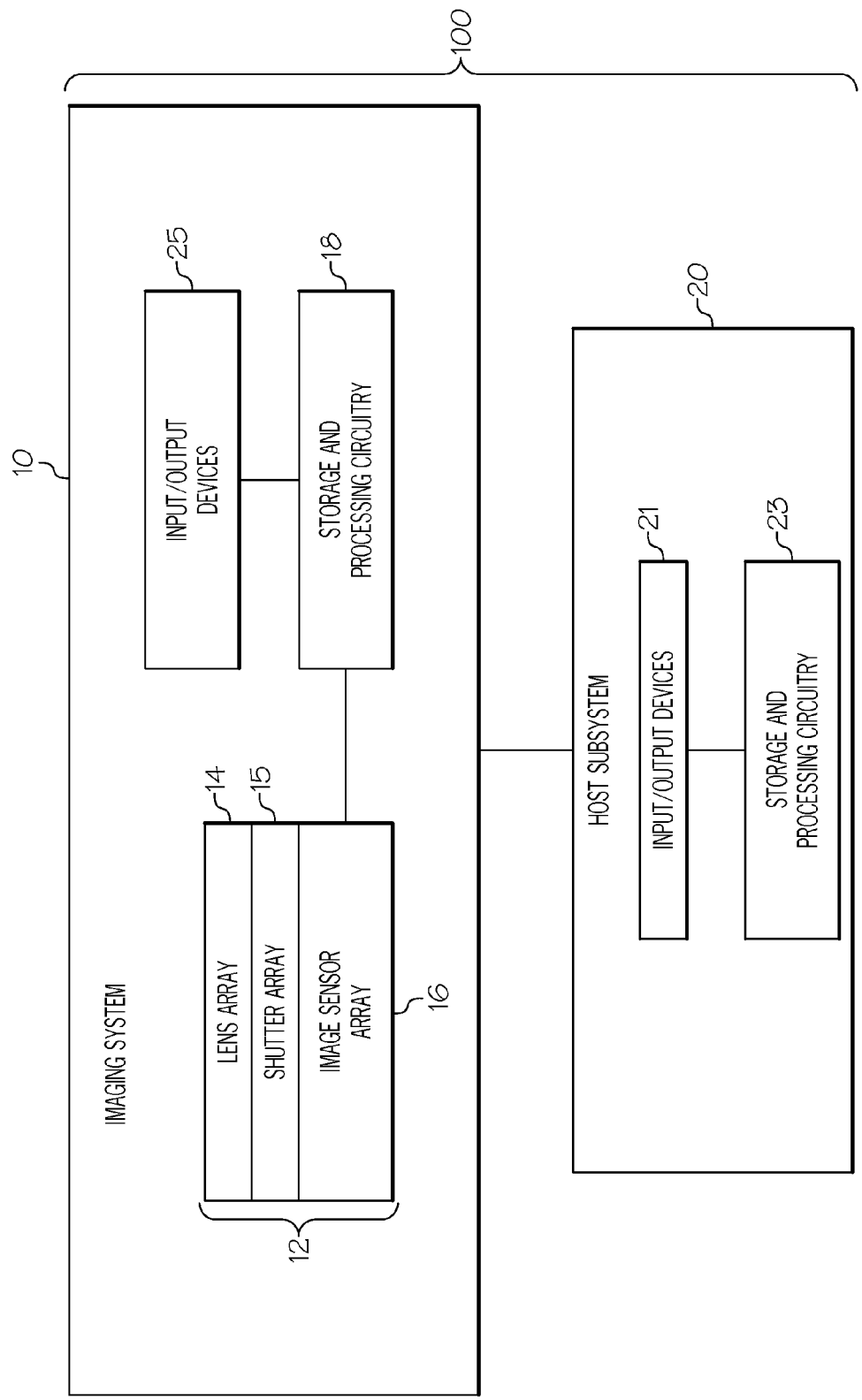
FIG. 1 is a diagram of an illustrative imaging system that contains a camera module with an array of lenses and an array of corresponding image sensors in accordance with an embodiment of the present invention.

Imaging systems having digital camera modules are widely used in electronic devices such as digital cameras, computers, cellular telephones, and other electronic devices. A digital camera module may include one or more image sensors that gather incoming light to capture an image.

In some situations, imaging systems may form a portion of a larger system such as a surveillance system or a safety system for a vehicle (e.g., an automobile, a bus, or any other vehicle). In a vehicle safety system, images captured by the imaging system may be used by the vehicle safety system to determine environmental conditions surrounding the vehicle. As examples, vehicle safety systems may include systems such as a parking assistance system, an automatic or semi-automatic cruise control system, an auto-braking system, a collision avoidance system, a lane keeping system (sometimes referred to as a lane drift avoidance system), etc. In at least some instances, an imaging system may form part of a semi-autonomous or autonomous self-driving vehicle. Such imaging systems may capture images and detect nearby vehicles using those images. If a nearby vehicle is detected in an image, the vehicle safety system may sometimes operate a warning light, a warning alarm, or may operate active braking, active steering, or other active collision avoidance measures. A vehicle safety system may use continuously captured images from an imaging system having a digital camera module to help avoid collisions with objects (e.g., other automobiles or other environmental objects), to help avoid unintended drifting (e.g., crossing lane markers) or to otherwise assist in the safe operation of a vehicle during any normal operation mode of the vehicle.

Vehicle safety standards may require that the proper operation of any component of a vehicle safety system (including imaging system components) be verified before, during, and/or after operation of the vehicle. Verification operations for imaging system components may be performed by an imaging system prior to and/or after operation of a vehicle (e.g., upon startup and/or shutdown of the imaging system). In these verification operations, concurrent operation of the imaging system may not be required. However, it may be desirable to continuously monitor the status of imaging system components during operation of the imaging system, particularly in situations in which vehicle safety may be influenced by the quality of imaging data provided by the imaging system. Imaging systems may be provided having this type of on-the-fly verification capability.

Image sensors may include arrays of image pixels arranged in a number of pixel rows and columns. The pixels in the image sensors may include photosensitive elements such as photodiodes that convert the incoming light into electric charge. Image sensors may have any number of pixels (e.g., hundreds or thousands or more). A typical image sensor may, for example, have hundreds, thousands, or millions of pixels (e.g., megapixels).

Image pixels may capture image data using pixel control signals such as charge transfer signals, pixel row select signals, and pixel reset signals (e.g., control signals that are provided by pixel control circuitry to control the operation of the image pixels). An image sensor may include verification circuitry (sometimes referred to herein as row control signal verification circuitry or control signal verification circuitry) for verifying the correct operation of the image sensor. For example, in situations in which images captured by the image sensors are used as input to an active control system for a vehicle, verification circuitry in the image sensor may be configured to compare row control signals with expected row control signals so that incorrect image sensor data (e.g., image sensor data captured using erroneous pixel control signals) is not input into the active control system.

Pixel control signals may be compared with a predetermined standard stored in the imaging system or stored on additional circuitry that is external to the imaging system. The predetermined standard may be a mathematically determined threshold or any other predetermined threshold and may include one or more mathematically or experimentally determined ranges to which verification data may be compared. The predetermined standard may, if desired, be determined by design requirements, mathematical modeling/simulation, manufacturing requirements, user requirements, regulatory requirements, or any other suitable requirements associated with image sensor performance.

Based on the result of the comparison of the pixel control signals with the predetermined standard, an imaging system may be disabled (e.g., if the result is outside the predetermined range), or may continue to operate normally (e.g., if the result is within the predetermined range). In some arrangements, the imaging system may remain in operation but an indicator may be presented to users to inform the users that the imaging system needs further inspection and/or repair (e.g., the imaging system may present a "check imaging system" indication when the results of verification operations indicate a potential problem in the operation of the imaging system).

FIG. 1 is a diagram of an illustrative imaging and response system including an imaging system that uses an image sensor to capture images. Imaging and response system 100 of FIG. 1 may be a vehicle safety system (e.g., an active braking system, an active steering system, a parking assist system, a collision warning system or other vehicle safety system), may be a surveillance system, or may be an electronic device such as a camera, a cellular telephone, a video camera, or other electronic device that captures digital image data.

As shown in FIG. 1, system 100 may include an imaging system such as imaging system 10 and host subsystems such as host subsystem 20. Imaging system 10 may include camera module 12, control circuitry such as storage and processing circuitry 18 and, if desired, input/output devices such as input/output devices 25.

Camera module 12 may be used to convert incoming light into electric charges and eventually into digital image data. Camera module 12 may include an array of lenses 14 and a corresponding array of image sensors 16. During image capture operations, light from a scene may be focused onto each image sensor in image sensor array 16 using a respective lens in lens array 14. If desired, camera module 12 may include an array of mechanical shutters such as shutter array 15 interposed between lens array 14 and image sensor array 16. Each shutter in shutter array 15 may be alternately closed or opened in order to block light from reaching a corresponding image sensor 16 or allow light to reach the corresponding image sensor 16 respectively. Lenses 14, shutters 15, and image sensors 16 may be mounted in a common package and may provide image data to storage and processing circuitry 18.

Storage and processing circuitry 18 may include one or more integrated circuits (e.g., image processing circuits, microprocessors, storage devices such as random-access memory and non-volatile memory, etc.) and may be implemented using components that are separate from camera module 12 and/or that form part of camera module 12 (e.g., circuits that form part of an integrated circuit that includes image sensors 16 or an integrated circuit within module 12 that is associated with image sensors 16). Image data that has been captured by camera module 12 may be processed and stored using processing circuitry 18. Processed image data may, if desired, be provided to external equipment such as host subsystem 20 using wired and/or wireless communications paths coupled to processing circuitry 18. Circuitry 18 may be configured to operate (e.g., open or close) one or more shutters in shutter array 15.

There may be any suitable number of lenses in lens array 14 and any suitable number of image sensors in image sensor array 16. Lens array 14 may, as an example, include N*M individual lenses arranged in an N×M array. The values of N and M may each be equal or greater than one, may each be equal to or greater than two, may exceed 10, or may have any other suitable values. Image sensor array 16 may contain a corresponding N×M array of individual image sensors. The image sensors of image sensor array 16 may be formed on one or more separate semiconductor substrates. With one suitable arrangement, which is sometimes described herein as an example, the image sensors are formed on a common semiconductor substrate (e.g., a common silicon image sensor integrated circuit die).

Each image sensor may be identical or there may be different types of image sensors in a given image sensor array integrated circuit. Each image sensor may be a Video Graphics Array (VGA) sensor with a resolution of 480×640 sensor pixels (as an example). Other types of sensor pixels may also be used for the image sensors if desired. For example, images sensors with greater than VGA resolution sensor (e.g., high-definition image sensors) or less than VGA resolution may be used, image sensor arrays in which the image sensors are not all identical may be used, etc.

In some modes of operation, all of the sensors on array 16 may be active. In other modes of operation, only a subset of the image sensors may be used. For example, a particular image sensor 16 may be placed in a "shutter" mode of operation in which the shutter in shutter array 15 corresponding to that image sensor is closed. As another example, a particular image sensor 16 may be placed in a "sample" mode of operation in which the shutter in shutter array 15 corresponding to that image sensor is open. Some sensors may be inactivated to conserve power (e.g., their positive power supply voltage terminals may be taken to a ground voltage or other suitable power-down voltage and their control circuits may be inactivated or bypassed).

Image sensors of image sensor array 16 may be provided with color filters such as red filters, blue filters, clear filters, and green filters. Each filter may form a color filter layer that covers the image pixels of the image sensor pixel array of a respective image sensor in the array. Other filters such as infrared-blocking filters, filters that block visible light while passing infrared light, ultraviolet-light blocking filters, white color filters, etc. may also be used. In an array with numerous image sensors, some of the image sensors may have clear filters, some may have red filters, some may have blue color filters, some may have green color filers, some may have patterned color filters (e.g., Bayer pattern filters, etc.), some may have infrared-blocking filters, some may have ultraviolet light blocking filters, or some may be visible-light-blocking-and-infrared-passing filters.

Storage and processing circuitry 18 may convey data (e.g., acquired image data, row control signals, or a result of a verification test) to host subsystem 20. Host subsystem 20 may include an active control system that delivers control signals for controlling vehicle functions such as braking or steering to external devices. Host subsystem 20 may include processing software for detecting objects in images, detecting motion of objects between image frames, determining distances to objects in images, filtering or otherwise processing images provided by imaging system 10. Host subsystem 20 may include a warning system configured to disable imaging system 10 and/or generate a warning (e.g., a warning light on an automobile dashboard, an audible warning or other warning) in the event that verification circuitry associated with one of the image sensors in image sensor array 16 determines that the image sensor is not functioning properly.

If desired, system 100 may provide a user with numerous high-level functions. In a computer or advanced cellular telephone, for example, a user may be provided with the ability to run user applications. To implement these functions, host subsystem 20 and/or imaging system 10 of system 100 may have input/output devices such as input/output devices 25 and 21 respectively. Input/output devices 25 and 21 may include devices such as keypads, input-output ports, joysticks, and displays coupled to storage and processing circuitry 18 and 23 respectively. Storage and processing circuitry 23 of host subsystem 20 may include volatile and nonvolatile memory (e.g., random-access memory, flash memory, hard drives, solid state drives, etc.). Storage and processing circuitry 23 may also include microprocessors, microcontrollers, digital signal processors, application specific integrated circuits, etc.

During operation of imaging system 10, camera module 12 may continuously capture and provide image frames to host subsystems such as host subsystem 20. During image capture operations, verification circuitry associated with one or more of the image sensors of image sensor array 16 may be occasionally operated in a verification mode of operation (e.g., following each image frame capture, following every other image frame capture, following every fifth image frame capture, during a portion of an image frame capture, etc.). While the verification circuitry is in a verification mode of operation, pixel control signals may be compared to a predetermined standard stored on storage and processing circuitry 18, storage and processing circuitry 23, and/or image sensor array 16. Following the comparison, storage and processing circuitry 18 may send status information (e.g., the result of the comparison, or a coded fault signal), pixel control signals, or other verification information to host subsystem 20.

Figure 2:
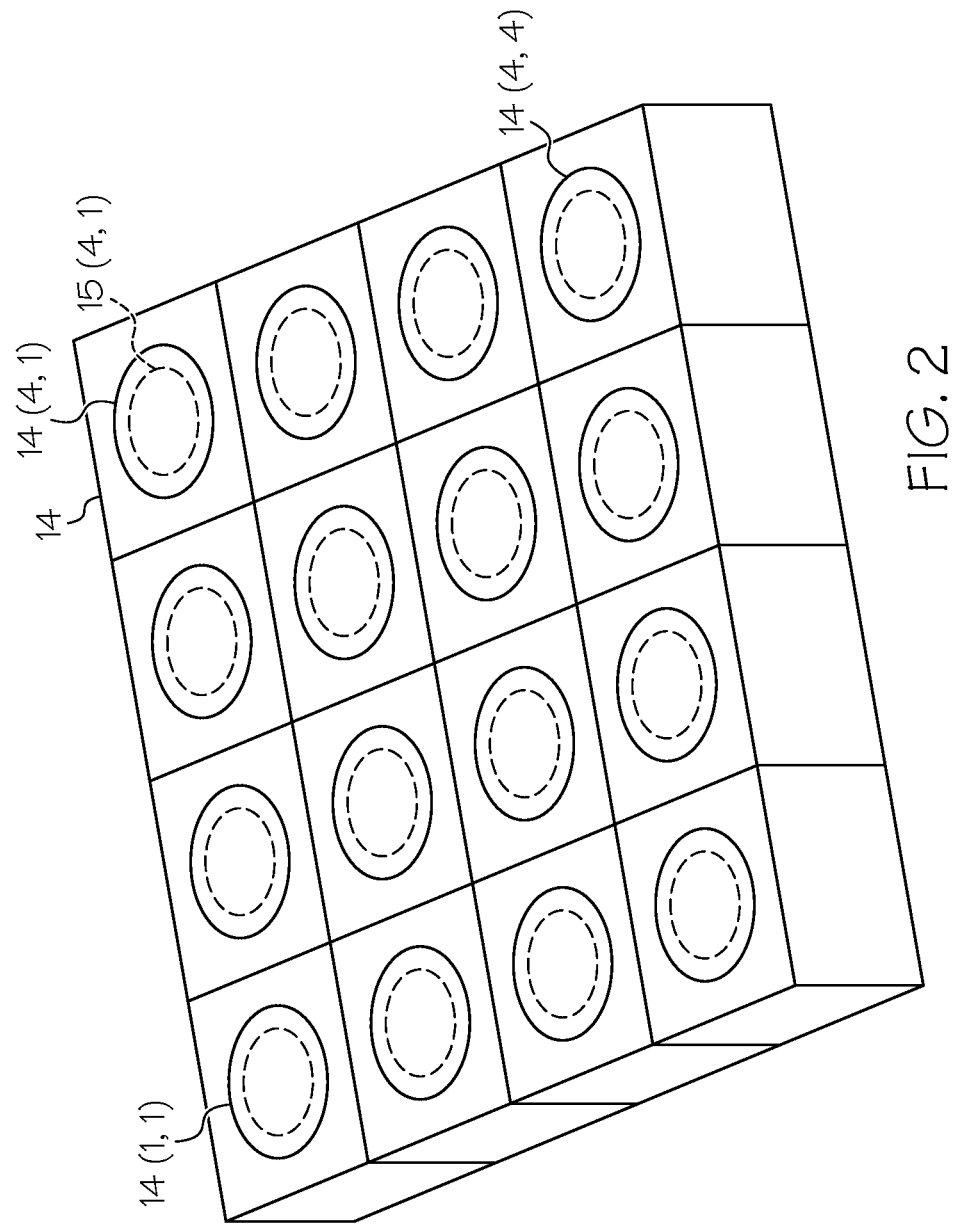
FIG. 2 is a perspective view of an illustrative camera module having an array of lenses in accordance with an embodiment of the present invention.

FIG. 2 is a perspective view of an illustrative camera module having an array 14 of lenses (e.g., lenses such as lenses 14(1,1), 14(4,1) and 14(4,4)). The array of lenses may, for example, be a rectangular array having rows and columns of lenses. The lenses may all be equally spaced from one another or may have different spacings. There may be any suitable number of lenses 14 in the array. In the FIG. 2 example, there are four rows and four columns of lenses. Each lens may have an associated shutter in shutter array 15 (e.g., mechanical shutters such as shutter 15(4,1)).

Figure 3:
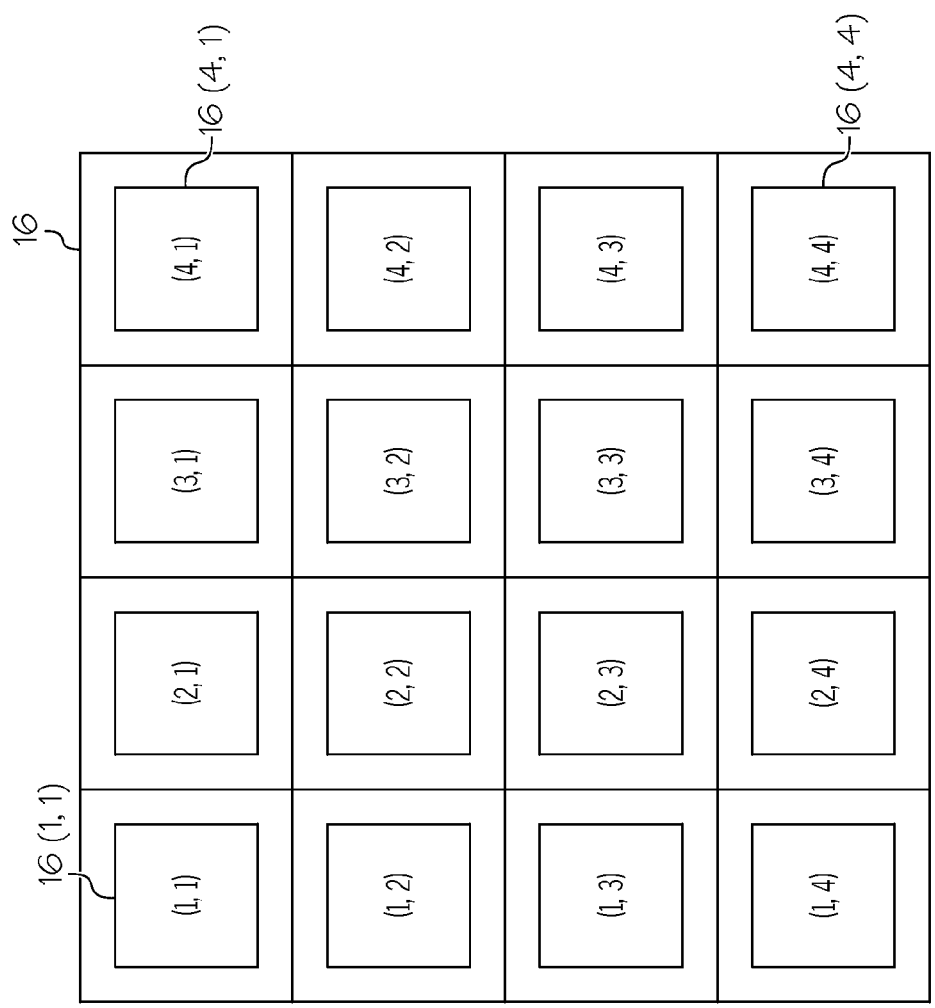
FIG. 3 is a diagram of an illustrative sensor array of the type that may be used with the lens array of FIG. 2 in a camera module in accordance with an embodiment of the present invention.

An illustrative sensor array of the type that may be used with the lens array of FIG. 2 is shown in FIG. 3. As shown in FIG. 3 sensor array 16 may include image sensors such as sensor 16(1,1), 16(4,1), and 16(4,4). The array of FIG. 3 has sixteen image sensors, but, in general, array 16 may have any suitable number of image sensors (e.g., one image sensor, two or more sensors, four or more sensors, ten or more sensors, 20 or more sensors, etc.).

Figure 4:
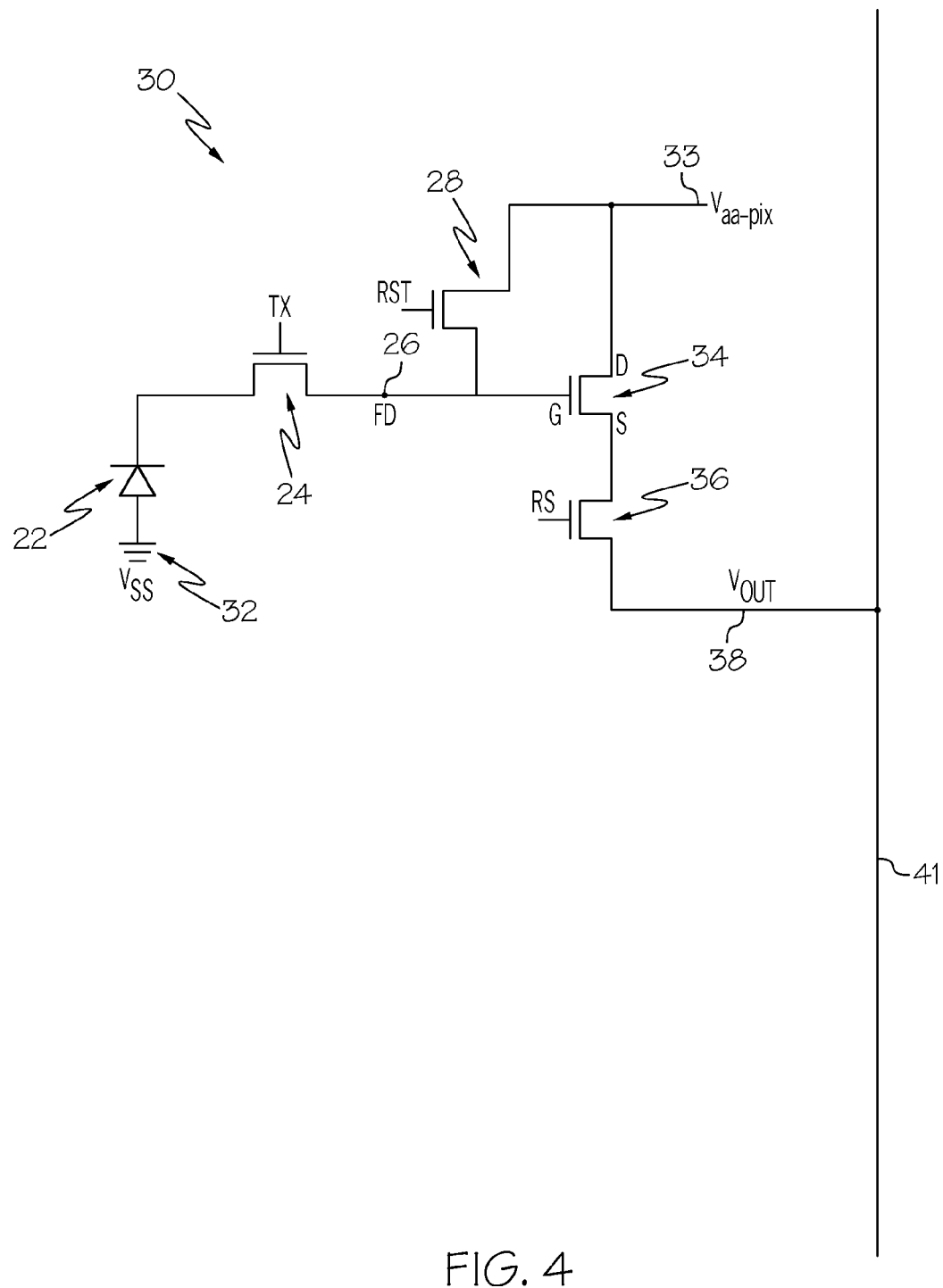
FIG. 4 is a diagram of an illustrative image sensor pixel in accordance with an embodiment of the present invention.

Circuitry in an illustrative pixel of one of the image sensors in sensor array 16 is shown in FIG. 4. As shown in FIG. 4, pixel 190 may include one or more photosensitive elements such as photodiode 22. A positive pixel power supply voltage (e.g., voltage Vaa_pix) may be supplied at positive power supply terminal 33. A ground power supply voltage (e.g., Vss) may be supplied at ground terminal 32. Incoming light is gathered by photodiode 22 after passing through a color filter structure. Photodiode 22 converts the light to electrical charge. Pixel control signals such as reset control signal RST, pixel row select signal RS, and transfer gate control signal TX (sometimes referred to as charge transfer signal TX) may be received by pixel 190 from pixel control circuitry.

Before an image is acquired, reset control signal RST may be asserted. This turns on reset transistor 28 and resets charge storage node 26 (also referred to as floating diffusion FD) to Vaa or another reset-level voltage. The reset control signal RST may then be deasserted to turn off reset transistor 28. After the reset process is complete, transfer gate control signal TX may be asserted to turn on transfer transistor (transfer gate) 24. When transfer transistor 24 is turned on, the charge that has been generated by photodiode 22 in response to incoming light is transferred to charge storage node 26.

Charge storage node 26 may be implemented using a region of doped semiconductor (e.g., a doped silicon region formed in a silicon substrate by ion implantation, impurity diffusion, or other doping techniques). The doped semiconductor region (i.e., the floating diffusion FD) exhibits a capacitance that can be used to store the charge that has been transferred from photodiode 22. The signal associated with the stored charge on node 26 is conveyed to row select transistor 36 by source-follower transistor 34.

When it is desired to read out the value of the stored charge (i.e., the value of the stored charge that is represented by the signal at the source S of transistor 34), row select control signal RS may be asserted. When signal RS is asserted, transistor 36 turns on and a corresponding signal Vout that is representative of the magnitude of the charge on charge storage node 26 (e.g., a reset-level or an image-level from photodiode 22) is produced on output path 38. In a typical configuration, there are numerous rows and columns of pixels such as pixel 190 in each image sensor in sensor array 16.

A conductive path such as path 41 can be associated with each column of image pixels 190 in an array of image pixels. When signal RS is asserted in a given row of image pixels 190, path 41 can be used to route signal $V_{OUT}$ from pixels in that row to column readout circuitry. If desired, column readout circuitry may include circuitry such as sample and hold circuitry, conversion circuitry, and other processing circuitry for reading out image signals from image pixels 190. If desired, pixel control signals such as control signals TX, RS, and RST may be received by image pixels 190 from pixel control circuitry in image sensor array 16. Pixel control signals TX, RS, and RST may be passed to verification circuitry for processing. Pixel control signals TX, RS, and RST may sometimes be referred to as pixel row control signals (e.g., because the pixel control signals may, if desired, by asserted to an entire row of image pixels 190 in an array of image pixels simultaneously).

If desired, other types of image pixel circuitry may be used to implement the image pixels of sensors array 16. For example, each image sensor pixel 190 may be a three-transistor pixel, a pin-photodiode pixel with four transistors, a global shutter pixel, a time-of-flight pixel, etc. The circuitry of FIG. 4 is merely illustrative.

Figure 5:
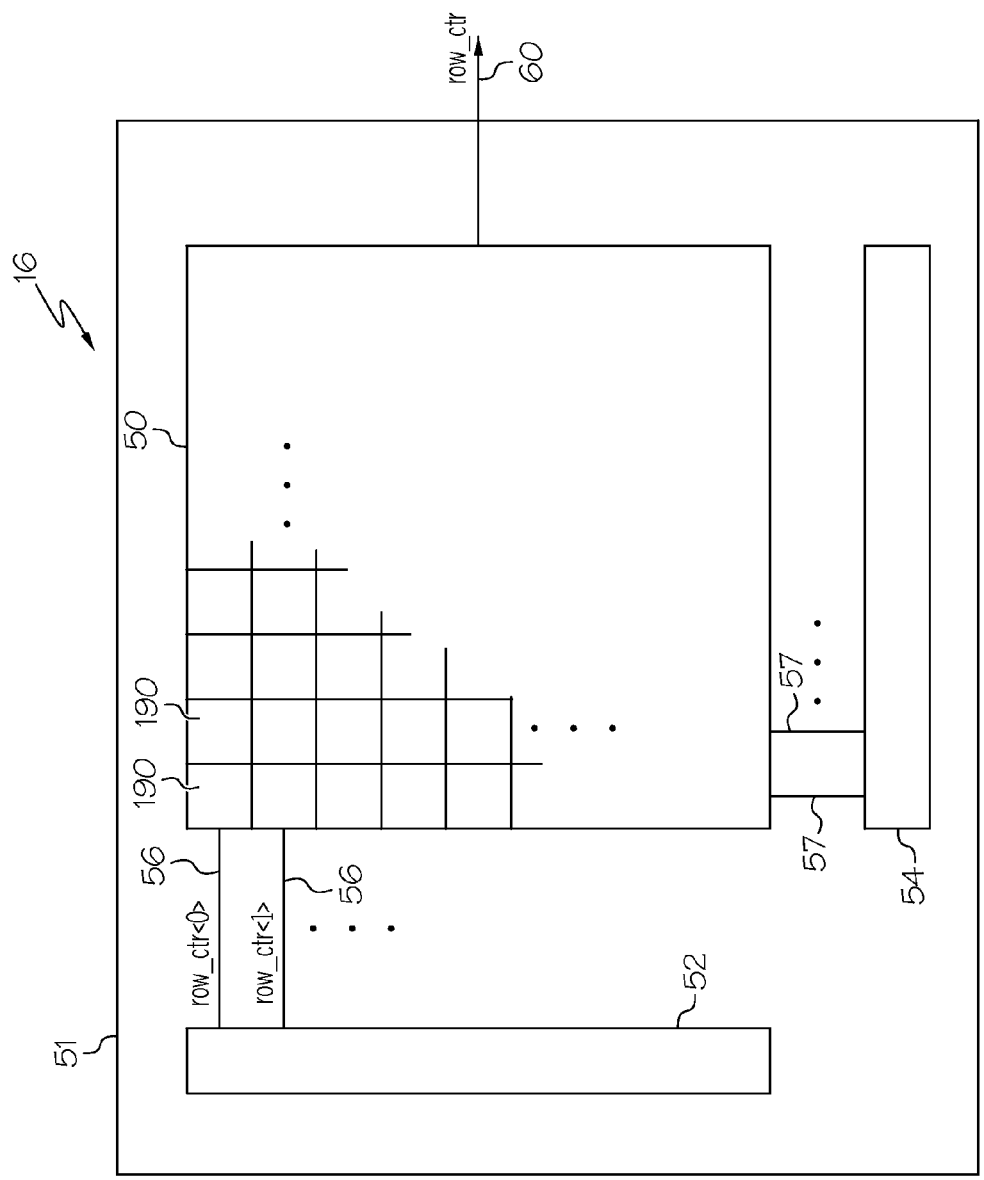
FIG. 5 is a top view of an illustrative image sensor having an image pixel array and row control circuitry in accordance with an embodiment of the present invention.

FIG. 5 is a diagram of an illustrative image sensor such as image sensor 16. As shown in FIG. 5, image sensor 16 may include an image sensor pixel array 50 having multiple image pixels 190 formed on a substrate 51 (e.g., a silicon image sensor integrated circuit die). Image pixels 190 in image pixel array 50 may be coupled to pixel control circuitry such as pixel row control circuitry 52. Each row of image pixels 190 in image pixel array 50 may be coupled to row control circuitry 52 through a respective row control line 56. Each column of image pixels 190 in pixel array 50 may be coupled to readout circuitry such as column readout circuitry 54 through a respective column readout line 57.

Row control circuitry 52 may supply pixel row control signals row_ctr such as reset signal RST, transfer signal TX, row select signal RS, and other row control signals to image pixels 190 (e.g., row control signals row_ctr<0> may be supplied to a first row of image pixels 190 in array 50, row control signals row_ctr<1> may be supplied to a second row of image pixels 190 in array 50, etc.). Column lines 57 are used for reading out image signals from image pixels 190. During image pixel readout operations, a pixel row in array 50 is selected by row control circuitry 52 and image data associated with image pixels 190 in that pixel row can be read out along column lines 57. Column readout circuitry 54 may include, for example, amplifier circuitry, analog-to-digital converter circuitry, memory circuitry, or other desired image data read out circuitry.

Image pixel array 50 may be coupled to row control signal verification circuitry via path 60. Row control circuitry 52 may pass row control signals row_ctr to the row control signal verification circuitry through image pixel array 50 and path 60. For example, row control signals row_ctr may be passed to path 60 from each row of image pixels 190 in array 50 (e.g., row control signals may be provided to path 60 after being asserted for image pixels 190, before being asserted for image pixels 190, or concurrently with assertion for image pixels 190 in a particular row of image pixels).

Figure 6:
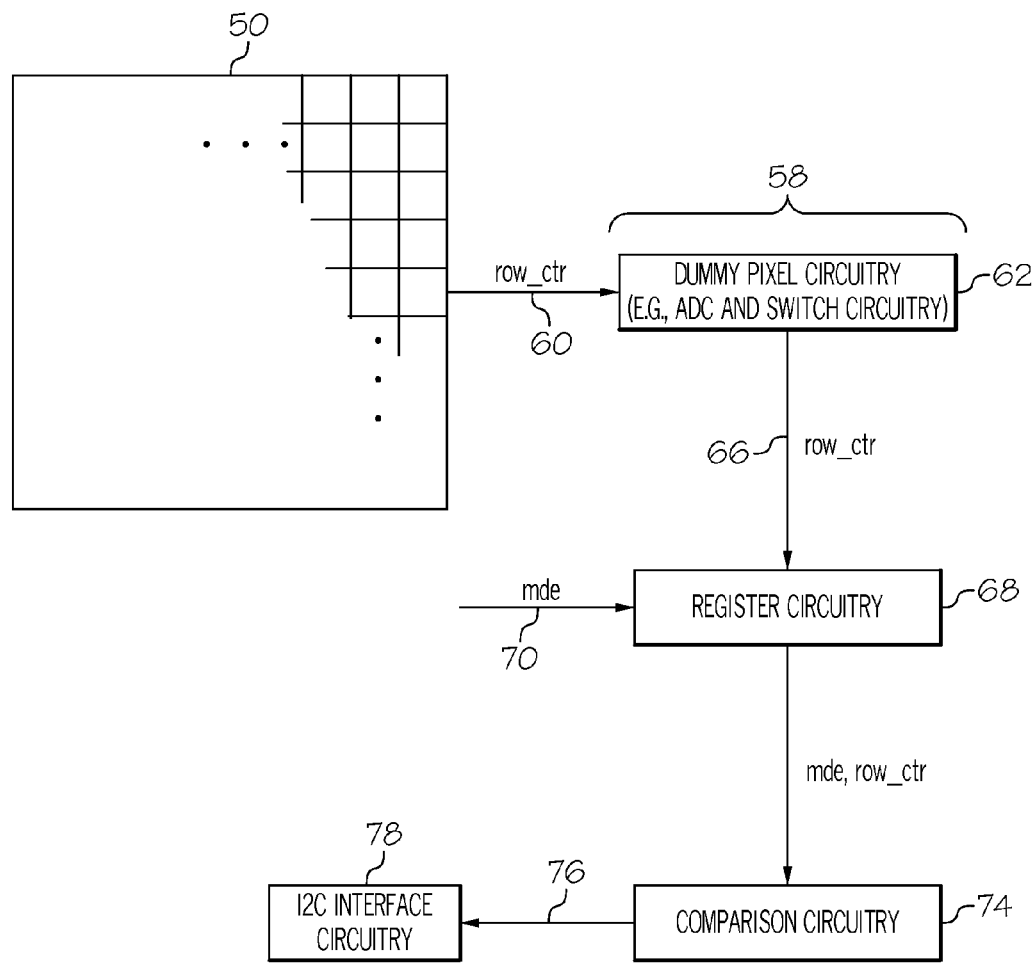
FIG. 6 is a top view of an illustrative image sensor having an image pixel array and row control signal verification circuitry in accordance with an embodiment of the present invention.

As shown in FIG. 6, image sensor array 50 may provide row control signals over path 60 to verification circuitry such as row control signal verification circuitry 58. Verification circuitry 58 may, for example, be formed as a part of image sensor 16 (e.g., on substrate 51), as a part of storage and processing circuitry 18 (FIG. 1), as a part of storage and processing circuitry 23 of host 20, or as separate processing circuitry in imaging system 10 or host 20.

As shown in FIG. 6, verification circuitry 58 may include dummy pixel circuitry such as dummy pixel circuitry 62. Dummy pixel circuitry 62 may, for example, include analog-to-digital converter circuitry and/or switch circuitry. Dummy pixel circuitry 62 may receive pixel row control signals such as transfer signal TX, row select signal RS, and reset signal RST from a particular row of image pixels 190 when that row is selected for image data read out by row control circuitry 52 (FIG. 5). Analog-to-digital converter circuitry in dummy pixel circuitry 62 may convert signals TX, RS, and RST to digital signals. Dummy pixel circuitry 62 may pass row control signals row_ctr to register circuitry 68. Register circuitry 68 may include multiple data registers for storing the row control signals for subsequent processing.

Processing circuitry such as processing circuitry 18 and/or processing circuitry 23 may generate a mode indication signal mde that indicates the mode of operation of image sensor 16. For example, signal mde may indicate that image sensor 16 is in a shutter mode (e.g., a mode in which the shutter for image sensor 16 is closed), a sample mode (e.g., a mode in which the shutter for image sensor 16 is opened), or a binned mode. Register circuitry 68 may receive mode indication signal mde from over line 70.

The magnitude of row control signals row_ctr may vary based on the mode of operation of image sensor 16. For example, row control circuitry 52 may provide row control signals row_ctr to image pixel array 50 at different signal levels based on the mode of operation of image sensor 16. Register circuitry 68 may identify row control signals row_ctr with particular mode indication signals mde to label the row control signals with the mode of operation of image sensor 16 with which row control signals row_ctr were provided to image pixel array 50. Mode indication signal mde and row control signals row_ctr may be passed to comparison circuitry 74.

If desired, row control signals row_ctr may be provided to image pixel array 50 with a boosted magnitude (e.g., a magnitude that is greater than that of row control signals row_ctr during normal operation of image sensor 16). Mode indication signal mde may include information about whether particular row control signals row_ctr are provided to array 50 with a boosted magnitude or a normal magnitude. In this way, particular row control signals row_ctr may be labeled to reflect whether those row control signals were provided to array 50 with a boosted or normal magnitude.

Comparison circuitry 74 may identify a respective predetermined control signal threshold for each row control signal row_ctr and for each mode of operation of image sensor 16 (e.g., as indicated by mode indication signal mde). For example, processing circuitry 18 may identify a first predetermined threshold for transfer signal TX when image sensor 16 is in a shutter mode, may identify a second predetermined threshold for transfer signal TX when image sensor 16 is in a sample mode, may identify a third predetermined threshold for row select signal RS when image sensor 16 is in sample mode, may provide a fourth predetermined threshold for row select signal RS when row control signals row_ctr are provided to array 50 with a boosted magnitude, may provide a fifth predetermined threshold for row select signal RS when row control signals row_ctr are provided to array 50 with a boosted magnitude when image sensor 16 is in a sample mode, etc. If desired, comparison circuitry 74 may identify ranges of acceptable control signal levels (e.g., a range of acceptable levels for each predetermined threshold, etc.). The range of acceptable control signal levels may, for example, be bounded by an associated predetermined threshold.

Comparison circuitry 74 may compare each row control signal row_ctr to the associated predetermined threshold. If the magnitude of a particular row control signal is greater than the associated predetermined threshold, that row control signal may be flagged. In another suitable arrangement, comparison circuitry 74 may compare each row control signal row_ctr to an associated predetermined range of acceptable values. If the magnitude of a particular row control signal is outside of the range of acceptable values (e.g., greater than an upper limit or less than a lower limit of the range of acceptable values), that row control signal may be flagged.

If the result of the comparison falls within the predetermined range of acceptable values, imaging system 10 may continue to operate normally. If the result of the comparison falls outside the predetermined range of values, the host subsystem 20 may be configured to disable some or all of imaging system 10 and/or, if desired, issue a warning to the operator of imaging system 10 (e.g., the driver of an automobile including system 100).

When a particular row control signal row_ctr is flagged, the row address corresponding to the flagged signal is stored. As an example, if a control signal row_ctr<1> (e.g., a transfer signal TX, row select signal RS, or reset signal RST from the second row of pixels 190 in array 50) is flagged, the row address corresponding to the second row of pixels 190 in array 50 may be stored. The row address may optionally be provided to external processing circuitry such as processing circuitry 23.

If desired, frame averaging may be enabled in response to a flagged row control signal. For example, successive image frames captured by pixel array 50 may be averaged in response to a flagged row control signal in order to reduce any errors in image data captured while the flagged row control signal is asserted (e.g., to mitigate the effect of erroneous row control signals on image data read out). If desired, verification circuitry 58 may ignore flagged row control signals when only control signals for a single row of pixels 190 in array 50 are flagged.

Row control signals row_ctr, mode indication signals mde, information about whether row control signals row_ctr are flagged (e.g., verification test results), and row addresses corresponding to flagged row control signals row_ctr may be provided to inter-integrated-circuit interface 78 over path 76. Inter-integrated-circuit interface 78 may sometimes be referred to as an inter-integrated-circuit bus, an Inter-IC bus, an IIC bus, an I²C, or an I2C interface. I2C interface 78 may provide row control signals row_ctr, mode indication signals mde, information about whether row control signals row_ctr are flagged, and row addresses corresponding to flagged row control signals row_ctr to processing circuitry such as storage and processing circuitry 18 (FIG. 1), storage and processing circuitry 23, or other processing circuitry.

Figure 7:
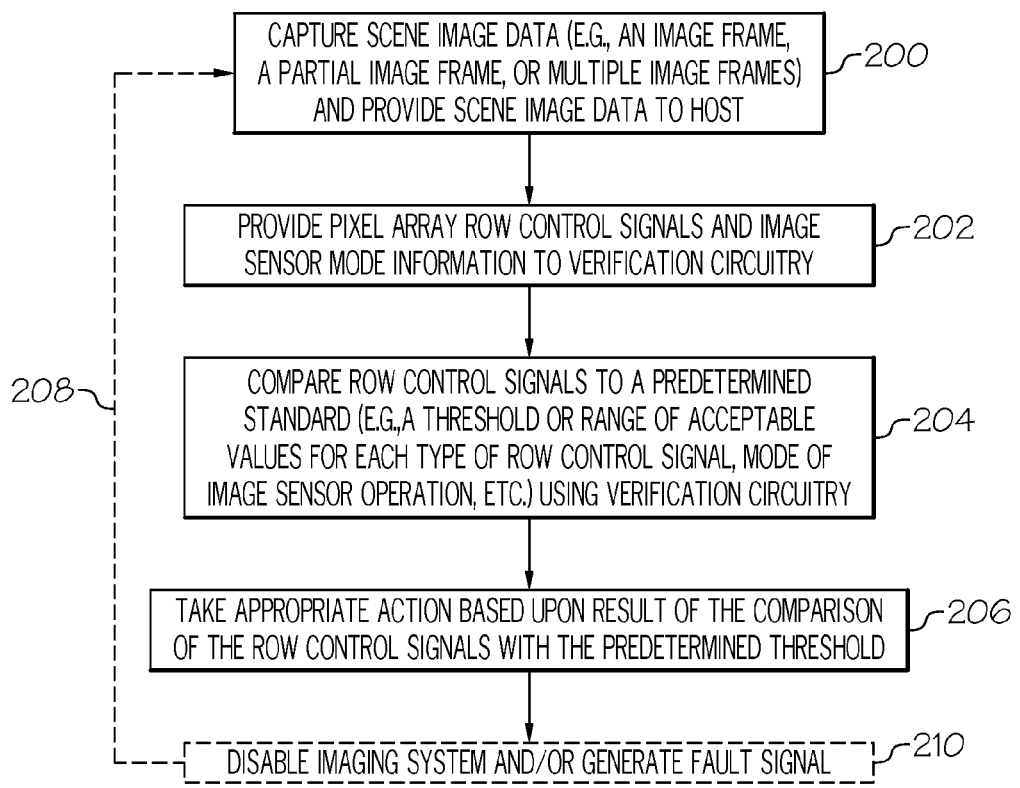
FIG. 7 is a flow chart of illustrative steps that may be used for continuous on-the-fly verification of imaging systems of the type shown in FIG. 1 in accordance with an embodiment of the present invention.

FIG. 7 is a flowchart showing illustrative steps that may be used in operating a system such as an imaging and response system of the type shown in FIG. 1.

At step 200, an imaging system such as imaging system 10 of FIG. 1 may be used to capture scene-image data such as one or more image frames or a portion of an image frame. Some or all of the captured scene-image data may be provided to a host such as host subsystem 20 of FIG. 1. During capture of the scene-image data, row control signals row_ctr such as transfer signal TX, row select signal RS, and/or reset signal RST may be supplied to all pixels of a pixel array 50 associated with imaging system 10. During capture of the scene-image data, imaging system 10 may be operated in a particular mode of operation such as a sample mode, a binned mode, or a shutter mode. Row control signals row_ctr may be supplied with a normal magnitude or a boosted magnitude that is greater than the normal magnitude. If desired, scene-image data may be processed using processing circuitry such as storage and processing circuitry 18 to process the image frames prior to delivery to host subsystem 20. If desired, image frames may be continuously captured, processed, and provided to host 20 (e.g., as part of a vehicle safety system such as an active control system).

At step 202, row control signals row_ctr that were used to control rows of image pixels for capturing scene-image data may be supplied to row control signal verification circuitry 58 (e.g., to dummy pixel circuitry 62 over line 60 as shown in FIG. 6). Mode indication signal mde that is indicative of the mode of operation of imaging system 10 may be provided to verification circuitry 58 (e.g., to register circuitry 68 over line 70). Mode indication signal mde may include information about whether row control signals row_ctr were provided to pixel array 50 with a normal magnitude or a boosted magnitude.

At step 204, row control signals row_ctr that were used to control the image pixels for capturing the scene-image data may be compared to a predetermined standard such as a predetermined row control signal threshold or a predetermined range of acceptable (tolerable) row control values. If desired, row control signals row_ctr may be compared to a respective predetermined threshold based on the type of row control signal (e.g., transfer signal TX, row select signal RS, reset signal RST), the mode of operation of imaging system 100 (e.g., binned mode, shutter mode, sample mode), and whether the row control signals were provided with a boosted magnitude or a normal magnitude.

At step 206, system 100 may take appropriate action based on the result of the comparison of the row control signals row_ctr with the predetermined standard. If the verification data is determined to be within a tolerable range of the predetermined standard (or below a predetermined threshold), system 100 may return to step 200 (as indicated by dashed line 208) and resume the cycle of image capture and imaging system verification during the remaining operation of system 100. If one or more row control signals row_ctr are determined to be outside the tolerable range of the predetermined standard, system 100 may proceed to step 210. If desired, row control signals row_ctr that are outside the tolerable range of the predetermined threshold may be flagged.

At optional step 210, host subsystem 20 may disable some or all of imaging system 10 and, if desired, generate a fault signal. Imaging system 10 or host subsystem 20 may generate a response to the fault signal such as an audible or visible failure alert signal for an operator of system 100 (e.g., an operator of a vehicle including a vehicle safety system such as system 100). In some arrangements, imaging system 10 may remain in operation but an indicator may be presented to the operator to inform the operator that the imaging system needs further inspection and/or repair (e.g., the imaging system may present a "check imaging system" indication when the results of verification operations indicate a potential problem in the operation of the imaging system).

Figure 8:
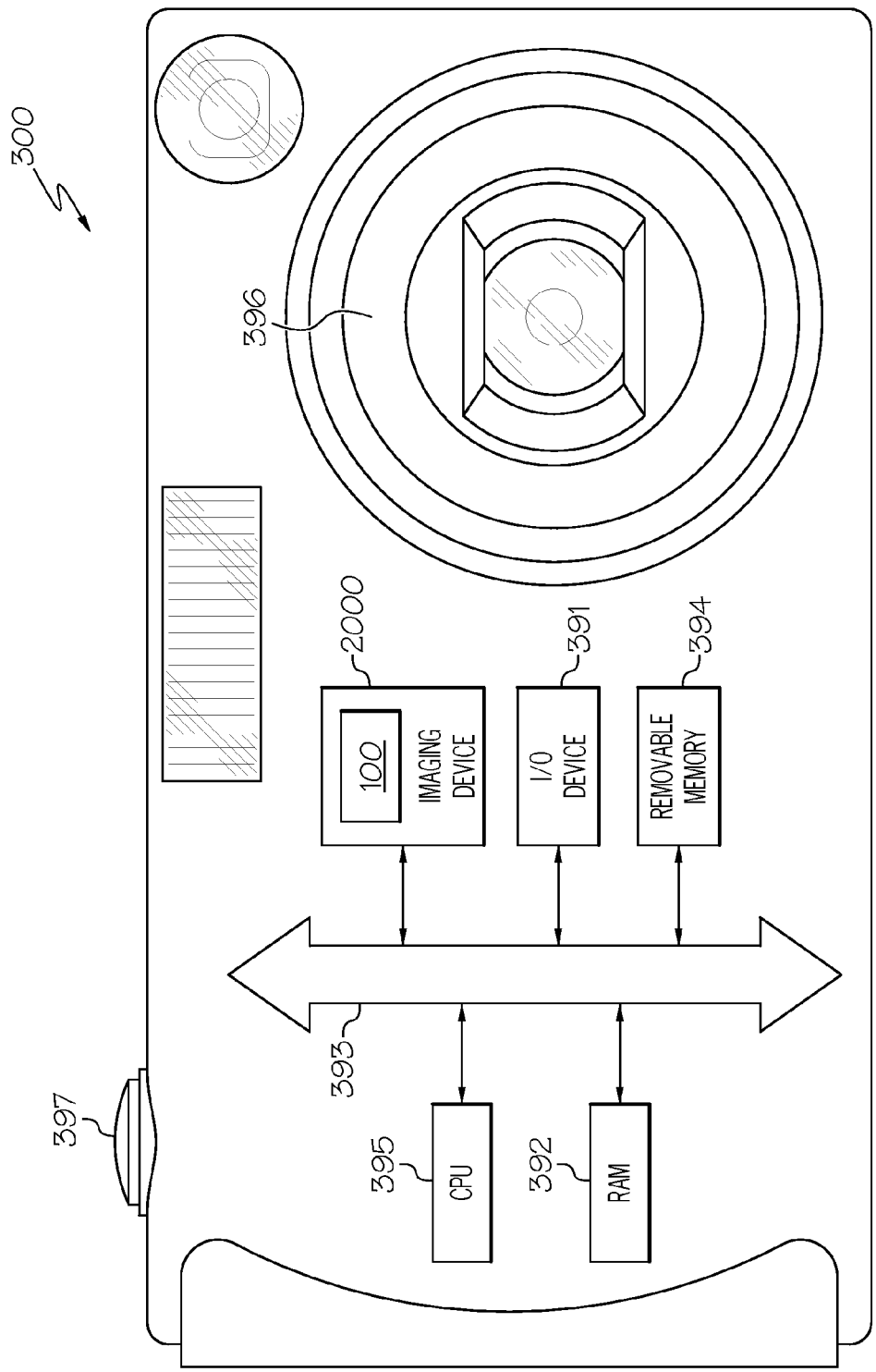
FIG. 8 is a block diagram of a processor system employing the image sensor of FIGS. 1-7 in accordance with an embodiment of the present invention.

FIG. 8 shows in simplified form a typical processor system 300, such as a digital camera, which includes an imaging device 2000 (e.g., an imaging device 2000 such as imaging system 100 of FIG. 1 employing row control signal verification as described above in connection with FIGS. 1-7). The processor system 300 is exemplary of a system having digital circuits that could include imaging device 2000. Without being limiting, such a system could include a computer system, still or video camera system, scanner, machine vision, vehicle navigation, video phone, surveillance system, auto focus system, star tracker system, motion detection system, image stabilization system, and other systems employing an imaging device.

The processor system 300, for example a digital still or video camera system, generally includes a lens 396 for focusing an image on pixel array 200 when a shutter release button 397 is pressed, central processing unit (CPU) 395, such as a microprocessor which controls camera and one or more image flow functions, which communicates with one or more input/output (I/O) devices 391 over a bus 393. Imaging device 2000 also communicates with the CPU 395 over bus 393. The system 300 also includes random access memory (RAM) 392 and can include removable memory 394, such as flash memory, which also communicates with CPU 395 over the bus 393. Imaging device 2000 may be combined with the CPU, with or without memory storage on a single integrated circuit or on a different chip. Although bus 393 is illustrated as a single bus, it may be one or more busses or bridges or other communication paths used to interconnect the system components.

Various embodiments have been described illustrating an imaging and response system (see, e.g., system 100 of FIG. 1) including an imaging system and host subsystems. An imaging system may include one or more image sensors. Each image sensor may be associated with one or more lenses and one or more mechanical shutters. Each image sensor may include an array of image pixels and row control circuitry formed on a substrate. The image pixel array may be coupled to row control signal verification circuitry (sometimes referred to as pixel control signal verification circuitry, signal verification circuitry, or verification circuitry).

The row control circuitry may provide pixel row control signals to the array of image pixels for capturing image data. The row control signal verification circuitry may receive the pixel row control signals from the row control circuitry through the array of image pixels. By receiving the row control signals from the row control circuitry through the array of image pixels, the row control signal verification circuitry may process the row control signals based on the operating mode and environmental conditions of the image pixels (e.g., the row control signal verification circuitry may accurately probe the row control signals for a variety of operating conditions of the imaging and response system). The verification circuitry may include dummy pixel circuitry having analog-to-digital converter circuitry and switching circuitry. The dummy pixel circuitry may pass the row control signals to register circuitry in the row control signal verification circuitry for storage.

The pixel row control signals may include charge transfer signals, pixel row select signals, and pixel reset signals. The pixel row control signals may be passed from the register circuitry to comparison circuitry in the row control signal verification circuitry. The comparison circuitry may identify predetermined ranges of acceptable row control signal magnitudes (e.g., the comparison circuitry may identify respective predetermined ranges of acceptable values based on each type of row control signal, mode of operation of the image sensor, and/or whether the row control signal is provided to the image pixel array with a boosted or normal magnitude). The row control circuitry may provide row control signals to each image pixel in the image pixel array with a normal magnitude and a boosted magnitude that is greater than the normal magnitude. The comparison circuitry may compare magnitudes of the pixel row control signals to the predetermined ranges of acceptable values.

If a the magnitude of the pixel row control signals is outside of a predetermined range of acceptable values (e.g., greater than an upper limit or less than a lower limit of the range), the row control signal verification circuitry may generate a fault signal to alert a user (operator) of the imaging system. If the magnitude of the pixel row control signals is within the predetermined range of acceptable values (e.g., less than an upper limit and greater than a lower limit of the range), the image system may capture additional image data with the image sensor pixels. The comparison circuitry may pass the pixel row control signals and information about whether the pixel row control signals are within or outside of the predetermined range to I2C interface circuitry in the row control signal verification circuitry.

The imaging and response system for verifying pixel control signals may be implemented in a system that also includes a central processing unit, memory, input-output circuitry, and an imaging device that further includes a lens for focusing light onto the array of image pixels and a data converting circuit.

The foregoing is merely illustrative of the principles of this invention and various modifications can be made by those skilled in the art without departing from the scope and spirit of the invention. The foregoing embodiments may be implemented individually or in any combination.

What is claimed is:

1. An imaging system, comprising:
    an array of image pixels, wherein each image pixel includes a photosensitive element configured to convert incoming light into electric charges;
    column readout circuitry coupled to the array of image pixels, wherein the column readout circuitry is coupled to the array of image pixels over column lines;
    row control circuitry coupled to the array of image pixels, wherein the row control circuitry is configured to provide row control signals to a gate terminal of at least one transistor in each image pixel in the array of image pixels for capturing image data; and
    control signal verification circuitry coupled to the array of image pixels, wherein the control signal verification circuitry is coupled to the array of image pixels via a path, wherein the path is different from the column lines, and wherein the control signal verification circuitry is configured to receive the row control signals from the row control circuitry through the array of image pixels and the path.

2. The imaging system defined in claim 1, wherein the control signal verification circuitry comprises:
    dummy pixel circuitry configured to receive the row control signals from the row control circuitry through the array of image pixels.

3. The imaging system defined in claim 2, wherein the dummy pixel circuitry comprises:
    analog-to-digital converter circuitry; and
    switching circuitry coupled to the analog-to-digital converter circuitry.

4. The imaging system defined in claim 2, wherein the control signal verification circuitry further comprises:
    register circuitry configured to receive and store the row control signals from the dummy pixel circuitry.

5. The imaging system defined in claim 4, wherein the control signal verification circuitry further comprises:
    comparison circuitry configured to receive the row control signals from the register circuitry.

6. The imaging system defined in claim 5, wherein the row control signals comprise:
    charge transfer signals;
    pixel row select signals; and
    pixel reset signals.

7. The imaging system defined in claim 5, wherein the comparison circuitry is further configured to identify a predetermined range of acceptable row control signal magnitudes and configured to compare the row control signals to the predetermined range of acceptable row control signal magnitudes.

8. The imaging system defined in claim 5, wherein the control signal verification circuitry further comprises:
    inter-integrated-circuit bus circuitry configured to receive the row control signals from the comparison circuitry.

9. The imaging system defined in claim 8, wherein the row control circuitry is configured to provide the row control signals to the image pixels with a normal signal magnitude and a boosted signal magnitude that is greater than the normal signal magnitude.

10. The imaging system defined in claim 9, wherein the comparison circuitry is further configured to identify a first predetermined range of acceptable row control signal magnitudes for row control signals with the normal signal magnitude and a second predetermined range of acceptable row control signal magnitudes for row control signals with the boosted signal magnitude.

11. A method of operating an imaging system having an array of image sensor pixels, row control circuitry, and pixel control signal verification circuitry, wherein the pixel control signal verification circuitry is coupled to the row control circuitry through the array of image sensor pixels, the method comprising:
    with the row control circuitry, supplying pixel control signals to a control terminal of at least one transistor in each image sensor pixel in the array of image sensor pixels;
    with the image sensor pixels, capturing image data using the pixel control signals;
    reading out the image data from the image sensor over a first path; and
    with the pixel control signal verification circuitry, receiving the pixel control signals through the image sensor pixels via a second path that is different from the first path, wherein the pixel control signal verification circuitry receives the pixel control signals concurrently with the image sensor pixels capturing image data using the pixel control signals.

12. The method defined in claim 11, further comprising:
    with the pixel control signal verification circuitry, identifying a predetermined range of acceptable values for the received pixel control signals; and with the pixel control signal verification circuitry, comparing the received pixel control signals to the predetermined range of acceptable values.

13. The method defined in claim 12, wherein comparing the received pixel control signals to the predetermined range of acceptable values comprises:
   comparing a magnitude of the received pixel control signals to the predetermined range of acceptable values.

14. The method defined in claim 13, further comprising:
   in response to determining that the magnitude of the received pixel control signals is outside of the predetermined range of acceptable values, generating a fault signal.

15. The method defined in claim 13, further comprising:
   in response to determining that the magnitude of the received pixel control signals is within the predetermined range of acceptable values, capturing additional image data with the image sensor pixels.

16. The method defined in claim 13, wherein the pixel control signals comprise charge transfer signals, pixel row select signals, and pixel reset signals, the method further comprising:
   with the pixel control signal verification circuitry, identifying first, second, and third predetermined ranges of acceptable values for the charge transfer, pixel row select, and pixel reset signals, respectively;
   with the pixel control signal verification circuitry, comparing a first magnitude that is associated with the charge transfer signals to the first predetermined range;
   with the pixel control signal verification circuitry, comparing a second magnitude that is associated with the pixel row select signals to the second predetermined range; and
   with the pixel control signal verification circuitry, comparing a third magnitude that is associated with the pixel reset signals to the third predetermined range.

17. The method defined in claim 13, wherein supplying the pixel control signals to each image sensor pixel comprises:
   supplying the pixel control signals to each image sensor pixel with a normal magnitude; and
   supplying the pixel control signals to each image sensor pixel with a boosted magnitude that is greater than the normal magnitude.

18. The method defined in claim 17, further comprising:
   with the pixel control signal verification circuitry, identifying a first predetermined range of acceptable values for the pixel control signals with the normal magnitude;
   with the pixel control signal verification circuitry, identifying a second predetermined range of acceptable values for the pixel control signals with the boosted magnitude;
   with the pixel control signal verification circuitry, comparing the received pixel control signals with the normal magnitude to the first predetermined range of acceptable values; and
   with the pixel control signal verification circuitry, comparing the received pixel control signals with the boosted magnitude to the second predetermined range of acceptable values.

19. A system, comprising:
   a central processing unit;
   memory;
   input-output circuitry; and
   an imaging device, wherein the imaging device comprises:
      a lens; and
      an image sensor comprising:
         an array of image pixels, wherein the lens focuses an image on the array of image pixels, wherein each image pixel includes a photosensitive element configured to convert incoming light into electric charges;
         row control signal verification circuitry coupled to the array of image pixels; and
         row control circuitry coupled to the array of image pixels, wherein the row control circuitry is configured to provide row control signals to transistors in each image pixel in the array of image pixels, and is further configured to provide the row control signals to the row control signal verification circuitry through the array of image pixels.

20. The system defined in claim 19, wherein the row control signal verification circuitry comprises:
   comparison circuitry configured to receive the row control signals from the array of image pixels and compare the received row control signals to a predetermined range of acceptable row control signal magnitudes.

* * * * *